Sept. 11, 1962　　　G. L. VARCOE　　　3,053,846
METHOD FOR THE MANUFACTURE OF 2,2'-DIPYRIDYL
Filed Jan. 17, 1961
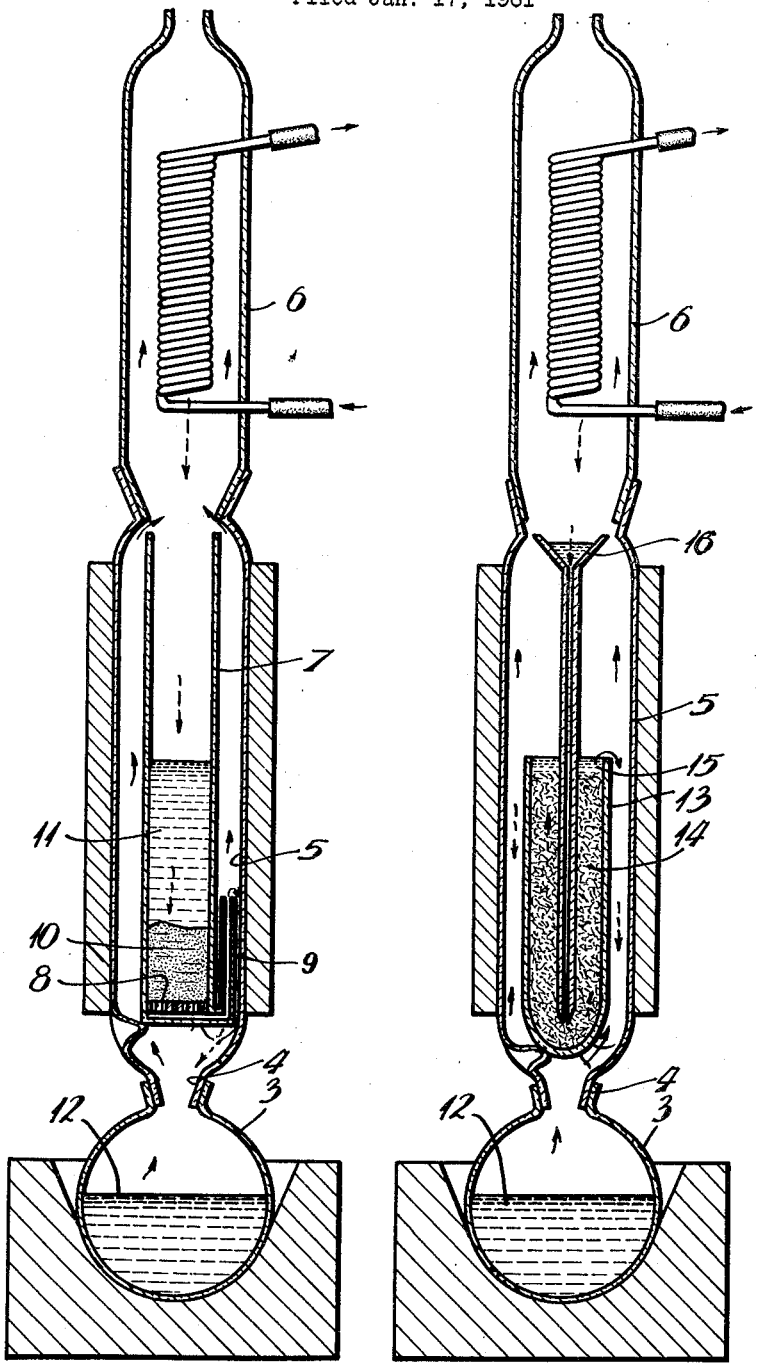
*FIG. 1.*　　*FIG. 2.*
INVENTOR
GRAEME LAURENCE VARCOE
BY Cushman, Darby & Cushman
ATTORNEYS United States Patent Office 3,053,846
Patented Sept. 11, 1962

3,053,846
METHOD FOR THE MANUFACTURE OF
2,2'-DIPYRIDYL
Graeme Laurence Varcoe, Essendon, Victoria, Australia, assignor to Imperial Chemical Industries of Australia and New Zealand Limited, Melbourne, Victoria, Australia, a company of Australia
Filed Jan. 17, 1961, Ser. No. 83,202
Claims priority, application Australia Jan. 18, 1960
10 Claims. (Cl. 260—296)

This invention relates to the production of 2,2'-dipyridyl by treating pyridine with a Raney nickel catalyst.

In the known method of carrying out this reaction, the pyridine and the catalyst are simply placed in contact and the pyridine is refluxed. However, it is found that in this method the catalyst rapidly loses its activity with the passage of time and as a result this leads to very low yields. Also, it is expensive in that the catalyst has to be frequently changed, and delay and inconvenience are caused in carrying out the process.

It is one object of the present invention to provide a method of producing 2,2'-dipyridyl from pyridine whereby the effective life of the catalyst is prolonged in comparison with the said known method. It is a further object of the present invention to provide a method of producing 2,2'-dipyridyl from pyridine whereby an increased space time yield of the product is obtained.

We have discovered that inactivation of the catalyst can be markedly retarded if the reaction products, including 2,2'-dipyridyl, are removed from the catalyst after formation and that thereby longer catalyst life, higher space time yields of 2,2'-dipyridyl and higher production rates may be obtained. We have further discovered that it is desirable to maintain the catalyst at temperatures above 80° C., preferably between 100 and 120° C. We have also discovered that it is desirable to maintain the space velocity, that is the ratio of mass of liquid pyridine flowing past the catalyst per hour to the mass of catalyst, above 3 to 1, preferably between 5 to 1 and 12 to 1.

Accordingly, we provide a method of producing 2,2'-dipyridyl wherein Raney nickel catalyst is maintained in contact with pyridine, characterised in that the reaction products including 2,2'-dipyridyl are removed from contact with the catalyst continuously or intermittently by displacement by the oncoming feed of unreacted pyridine.

We also provide a method of producing 2,2'-dipyridyl characterised in that in the above stated process the catalyst is maintained at a temperature of over 80° C., preferably at 100–120° C. Furthermore, in the process of this invention, the temperature of reaction on the Raney nickel catalyst may be maintained by heat exchange between a stream of hot pyridine vapour and a stream of condensed pyridine, said heat exchange being effected either directly simultaneously with mass exchange between the liquid and the vapour phase or by means of a heat exchanger. In addition, we provide a process wherein the ratio of the mass of liquid pyridine per hour flowing past the catalyst and in contact with it to the mass of catalyst is maintained greater than 3:1, preferably between 5:1 and 12:1.

We also provide a process for the manufacture of 2,2'-dipyridyl broadly defined above where the unreacted pyridine is separated from the reaction products and purified, e.g. by distillation, preferably by rectification in a still from which the purified pyridine is taken off as the overhead vapour, and is recycled to the above described catalytic process. The still preferably has a plate efficiency under operating conditions equivalent to more than 8 theoretical plates.

While it is feasible to operate our process above atmospheric pressure and hence at temperatures above 120° C. and while this invention is not limited to the boiling point of pyridine at atmospheric pressure, the further gain in yield in doing so is offset by the inconvenience of a pressure process and the higher rate of tar formation. Equally it is within the scope of this invention to operate the process at space velocities above 12, but at very high space velocities, e.g. over 20, the gain in space time yield becomes smaller and is offset by the rise in cost of the recovery of the product from unreacted pyridine. In plant operation the most economical space velocity will depend on desired production volume and on the balance of other cost factors e.g. the size of the converter (catalyst zone), distillation equipment for recovery of unreacted pyridine, and steam cost, but in any case substantial improvements in yields are obtained at space velocities above 3.

Without prejudice to the validity of our invention by the correctness or otherwise of theoretical explanations we consider that the mechanism underlying our discovery is inactivation of the catalyst not only by reaction by-products or by impurities in the pyridine but by the 2,2'-dipyridyl itself.

In one specific embodiment the method of this invention is characterised in that pyridine near its boiling point is percolated through a porous bed of Raney nickel catalyst and also in that the 2,2'-dipyridyl is continuously removed after formation from the catalyst by displacement by oncoming unreacted liquid pyridine.

In another embodiment of the invention liquid pyridine near its boiling point is passed through a bed of catalyst upwardly; in this arrangement the catalyst is embedded in a closed receptacle e.g. a thimble which is open at the top only and the reaction products comprising the 2,2'-dipyridyl and the unreacted pyridine overflow from the top of the receptacle into the boiler. The pyridine refluxed from the condenser is collected e.g. by a funnel or by other known reflux collecting device and is fed to the bottom of the catalyst bed by means of tubing. The pressure required to produce flow through the packed catalyst bed is conveniently derived from the liquid head of pyridine in the tubing. This embodiment has the advantage of more even and faster flow of pyridine through the catalyst bed.

A convenient method of controlling the temperature of the catalyst near the boiling point of pyridine is to pass pyridine vapour from the boiler along the receptacle containing the catalyst and the refluxed pyridine, that is to provide heat exchange through the walls of the receptacle or, alternatively, to permit partial mass exchange between the pyridine vapour and the refluxing pyridine.

The present invention also provides apparatus for the production of 2,2'-dipyridyl comprising a boiler, tubing connecting the boiler to a reflux condenser, Raney nickel catalyst contained in a receptacle and submerged in liquid pyridine, said receptacle being located in the path of the liquid pyridine returning from the condenser to the boiler, and an outlet tube extending upwardly from the bottom of the receptacle to open into the boiler.

Alternatively, the present invention provides apparatus for the production of 2,2'-dipyridyl comprising a boiler, tubing connecting the boiler to a reflux condenser, Raney nickel catalyst contained in a receptacle and submerged in liquid pyridine, said receptacle being located in the path of the liquid pyridine returning from the condenser to the boiler and having an opening to permit overflow of the liquid in the receptacle, reflux collecting means, and ducting attached thereto directing the collected reflux to the bottom of the catalyst bed.

As the catalyst is spontaneously inflammable when dry, it is necessary to ensure that it is covered at all times by liquid pyridine.

For laboratory-scale production of this compound the apparatus may conveniently be a modified Soxhlet apparatus.

Practical arrangements of apparatus according to the present invention will now be described with reference to the accompanying drawings. In these drawings:

FIG. 1 is a longitudinal section of one apparatus;
FIG. 2 is a longitudinal section of a second apparatus.

Referring now to FIG. 1 of the drawings, the apparatus there illustrated comprises a boiler 3 opening through tubing 4 into an insulated casing 5 which in turn opens into a reflux condenser 6 located axially above the casing 5. The condenser 6 is open to the atmosphere.

Resting within the casing 5 coaxially therewith is a separate tubular reaction vessel 7. A liquid-permeable sintered glass disc 8 extends across the tube 7 adjacent the closed lower end thereof, and a side tube 9 opens into the space between the disc 8 and the end of the tube 7 to extend outside and upwardly along part of the length of the tube 7. Raney nickel catalyst 10 covered by a quantity 11 of pyridine is placed inside the tube 7 to rest on the disc 8.

In operation, a further quantity 12 of pyridine is boiled in the boiler 3 at a temperature of approximately 115° C., depending on the atmospheric pressure, the vapour passing upwardly through the casing 5 outside the tube 7 to the condenser 6, where it condenses and falls into the tube 7. As the hydrostatic head of pyridine 11 increases, some of the pyridine 11 is forced through the catalyst 10. Portion of the pyridine passing through the catalyst reacts to form 2,2′-dipyridyl, and the reaction products together with unreacted pyridine are forced upwardly through the side tube 9 from the open end of which the reaction products and pyridine fall into the boiler 3. The unreacted pyridine is then recycled through the apparatus. From time to time the pyridine and reaction products may be removed from the boiler 3 and fresh pyridine added until the catalyst becomes inactivated.

By using this apparatus the catalyst is maintained at all times covered with pyridine, thereby obviating the danger of explosion. Furthermore, the reaction products are continuously removed from contact with the catalyst shortly after formation.

In the apparatus illustrated in FIG. 2, the boiler 3, tubing 4, casing 5, and reflux condenser 6 are of the same construction as that described with reference to FIG. 1. Resting within the casing 5 coaxially therewith is a separate tube 13 closed at the lower end and partially filled with Raney nickel catalyst 14, the remainder of the tube 13 being occupied by pyridine 15. A funnel 16 is inserted axially into the catalyst 14 so that the mouth of the funnel is above the open end of the tube 13 and the lower end of the funnel stem opens into the lower region of the tube 13.

In operation, a further quantity 12 of pyridine is boiled in the boiler 3, the pyridine vapour passing upwardly between the tube 13 and the casing 5 to the condenser 6. The condensed vapour falls into the mouth of the funnel 16, where it builds up sufficient hydrostatic head to force some of the pyridine upwardly from the lower end of the funnel stem through the catalyst 14 to overflow from the tube 13 into the boiler 3. In passing through the catalyst 14, some of the pyridine reacts in contact with the catalyst, and the reaction products are carried over into the boiler 3. The unreacted pyridine is recycled through the apparatus. The pyridine and reaction products may be removed from the boiler 3 and replaced by fresh pyridine.

In this apparatus also, the catalyst is maintained covered by pyridine, and the reaction products are continuously removed from contact with the catalyst shortly after the said reaction products are formed.

The following examples illustrate the invention:

*Example 1*

Degassed Raney nickel was prepared from Raney nickel alloy (100 g.) in an evacuated flask by the conventional method as described by Badger and Sasse (J. Chem. Soc., 1956, 616). Into the Raney nickel catalyst commercial pyridine (300 g.) with a boiling range of 2° C. was introduced; the catalyst slurry in pyridine was then transferred to the tube 7 of the apparatus shown in FIG. 1, i.e. a modified Soxhlet type apparatus, taking great care to prevent exposure of the dry catalyst to air, because of the known pyrophoric nature of the catalyst, and allowing the excess of pyridine over the capacity of the tube to overflow into the boiler 3 through the side arm 9. In the tube the catalyst formed a bed of approximately 2″ thickness under an 8″ head of pyridine.

The boiler 3 was heated so that the flow of refluxed liquid pyridine through the catalyst was at a rate of approximately 10 ml. per minute. From time to time, the reaction was stopped and the mixture in the boiler was replaced with fresh pyridine. The product was isolated by distillation with the following results:

| Time, hrs.: | Total dipyridyl isolated, gms. |
|---|---|
| 11 | 66 |
| 23 | 106 |
| 44 | 149 |
| 91 | 216 |
| 114 | 251 |
| 163 | 289 |
| 256 | 347 |
| 346 | 400 |

Extrapolation of the yield curve gives an ultimate yield of about 500 gms.

The 2,2′-dipyridyl boiled over a 4° C. range i.e. 146 to 150° C. at about 20 mm. Hg pressure and was substantially free of unwanted isomers; it did, however, turn brown after storage for a few weeks. The recovered pyridine was examined by gas chromatography and appeared to be equivalent in quality to the starting material. Some distillation residue was formed but it amounted to less than 5% by weight of the product.

*Example 2*

For comparison, an experiment was carried out in which the same catalyst and pyridine were used in the same amounts, but with the catalyst permanently immersed in the total quantity of boiling pyridine in the boiler, without use of the modified Soxhlet apparatus; this gave the following results:

| Time, hrs.: | Total dipyridyl isolated, gms. |
|---|---|
| 11 | 14 |
| 51 | 19.7 |
| 141 | 20.3 |

It is therefore clear that the use of the method and of the apparatus of this invention provides an outstanding increase in the effective life of the catalyst, with consequent improvement in the commercial production of 2,2′-dipyridyl.

*Example 3*

The experiment of Example 1 was repeated, using, however, the apparatus of FIGURE 1 in a slightly modified form. The annulus formed between the external casing 5 and the tube 7 was packed with glass helices to provide a packed rectification column. During the experiment part of the refluxing pyridine was distributed over the packing by known means not shown in FIGURE 1 and the balance of the reflux was directed into the tube 7. The total boil-up rate was kept at such a level that the flow rate of liquid pyridine through the tube 7 was approximately 10 mls. per minute and the rectification attained in the annulus was equivalent to approximately 8 theoretical plates. The reaction was maintained for 114 hours and the product was isolated by distillation as in Example 1. The total yield after 114 hours was 343 grams. Compared with Example 1 this constituted an improvement in yield of 37%.

Example 4

Example 1 was repeated using however a flow rate of liquid pyridine through the catalyst bed of approximately 6.8 mls. per minute. After maintaining the reaction for 55 hours a total yield of 114 grams of 2,2'-dipyridyl was obtained. Although this yield was still vastly superior to the yields of Example 2, compared with Example 1 it demonstrated the advantageous effect of the higher space velocity of Example 1 on space time yield.

Example 5

The experiment of Example 1 was repeated with the condenser 6 sealed from the atmosphere and the pressure in the system reduced by means of a vacuum pump to give a boiling point of approximately 100° C. in the boiler. The flow rate of pyridine past the catalyst under these conditions was again approximately 10 mls. per minute. The total yield obtained after 60 hours was 108 grams, that is, if the results of Example 1 are represented graphically and the yield at 60 hours is estimated by interpolation, the yield of Example 5 was approximately 60% of that obtained in Example 1 at 115° C., demonstrating thus the temperature effect.

Example 6

Example 1 was repeated using a flow rate of liquid pyridine through the catalyst bed of approximately 8.4 mls. per minute. After 1 hour a yield of 11.5 grams of 2,2'-dipyridyl was obtained.

Example 7

Example 1 was repeated, using the apparatus of FIG. 2 instead of that of FIG. 1. Substantially identical results were obtained.

I claim:

1. In a method of producing 2,2'-dipyridyl by maintaining pyridine in contact with Raney nickel catalyst, the improvement which comprises: maintaining said catalyst in a reaction zone; passing an unreacted pyridine feed into said reaction zone whereby 2,2'-dipyridyl is formed therein; and displacing a mixture of unreacted pyridine and reaction products including said 2,2'-dipyridyl from said reaction zone with more pyridine feed.

2. A method according to claim 1 wherein the reaction products including 2,2'-dipyridyl are separated from the unreacted pyridine in the displaced mixture and wherein the unreacted pyridine is purified and recycled to the catalyst.

3. A method according to claim 2 wherein the process of separating the reaction products including 2,2'-dipyridyl from pyridine and of purifying the unreacted pyridine is carried out in one step by rectification in a still, and wherein the purified pyridine is taken off as the overhead vapour, is condensed, and is recycled to said reaction zone.

4. A method according to claim 3 wherein the plate efficiency of the still under operating conditions is equivalent to more than 8 theoretical plates.

5. A method according to claim 1 wherein the pyridine in contact with the catalyst is maintained at temperatures above 80° C.

6. A method according to claim 5 wherein the pyridine in contact with the catalyst is maintained at a temperature between 100° and 120° C.

7. A method according to claim 3 wherein the temperature of reaction on the Raney nickel catalyst is maintained by heat exchange between said hot pyridine vapour and said condensed pyridine.

8. A method according to claim 1 wherein the pyridine in said reaction zone is maintained near or at its boiling point.

9. A method according to claim 1 wherein the ratio of the mass of liquid pyridine per hour flowing past the catalyst and in contact with it to the mass of catalyst is greater than 3:1.

10. A method according to claim 9 wherein the ratio of liquid pyridine per hour flowing past the catalyst and in contact with it to the mass of catalyst is between 5:1 and 12:1.

References Cited in the file of this patent

UNITED STATES PATENTS

| | | |
|---|---|---|
| 2,066,198 | Buc | Dec. 29, 1936 |
| 2,384,230 | Arnold | Sept. 4, 1945 |

OTHER REFERENCES

Jones: J. Chem. Soc., 1950, pages 1392–7.
Badger et al.: J. Chem. Soc., 1956, pages 616–20.
Sargesson et al.: Chem. Abstracts, vol. 52, column 20158 (1958).